United States Patent
Chang et al.

(10) Patent No.: US 9,979,690 B2
(45) Date of Patent: *May 22, 2018

(54) METHOD AND APPARATUS FOR SOCIAL NETWORK COMMUNICATION OVER A MEDIA NETWORK

(71) Applicant: Nuance Communications, Inc., Burlington, MA (US)

(72) Inventors: Hisao Chang, Medina, MN (US); David Mornhineway, Marietta, GA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/257,171

(22) Filed: Sep. 6, 2016

(65) Prior Publication Data

US 2016/0373399 A1 Dec. 22, 2016

Related U.S. Application Data

(63) Continuation of application No. 14/966,574, filed on Dec. 11, 2015, now Pat. No. 9,461,957, which is a
(Continued)

(51) Int. Cl.

| | |
|---|---|
| *H04L 12/58* | (2006.01) |
| *H04L 12/18* | (2006.01) |
| *G06Q 50/00* | (2012.01) |
| *H04M 3/533* | (2006.01) |
| *G10L 15/22* | (2006.01) |
| *G10L 15/26* | (2006.01) |

(Continued)

(52) U.S. Cl.
CPC .............. *H04L 51/32* (2013.01); *G06Q 50/01* (2013.01); *G10L 15/22* (2013.01); *G10L 15/26* (2013.01); *G10L 25/87* (2013.01); *H04L 12/1818* (2013.01); *H04L 51/046* (2013.01); *H04L 67/141* (2013.01); *H04L 67/306* (2013.01); *H04M 3/53366* (2013.01); *G10L 15/00* (2013.01); *G10L 19/00* (2013.01); *H04M 2201/60* (2013.01); *H04M 2203/655* (2013.01)

(58) Field of Classification Search
CPC ... G10L 15/22; G10L 2015/225; G10L 15/28; G10L 15/30; H04L 51/32; H04L 12/1818; H04L 51/046; G06Q 50/01; H04M 3/53366

See application file for complete search history.

(56) References Cited

U.S. PATENT DOCUMENTS

| | | | |
|---|---|---|---|
| 4,309,571 A * | 1/1982 | Chamberlin | H04M 11/10 360/74.1 |
| 5,600,821 A * | 2/1997 | Falik | G11C 29/82 379/88.28 |

(Continued)

*Primary Examiner* — Eric Yen

(57) ABSTRACT

A system that transmits a request to initiate a communication session with a member device of a social network may include, for example, activating a speech capture element, maintaining activation of the speech capture element in accordance with a pattern of prior speech messages, detecting a speech message at the activated speech capture element, and transmitting the detected speech message, or a derivative thereof, to the member device of the social network. Other embodiments are disclosed.

20 Claims, 9 Drawing Sheets

Related U.S. Application Data continuation of application No. 14/339,536, filed on Jul. 24, 2014, now Pat. No. 9,246,868, which is a continuation of application No. 13/185,485, filed on Jul. 18, 2011, now Pat. No. 8,825,493.

(51) Int. Cl.
  *H04L 29/08* (2006.01)
  *G10L 25/87* (2013.01)
  *G10L 15/00* (2013.01)
  *G10L 19/00* (2013.01)

(56) References Cited

U.S. PATENT DOCUMENTS

| | | | |
|---|---|---|---|
| 5,784,436 A * | 7/1998 | Rosen | H04M 1/654 |
| | | | 379/377 |
| 5,864,805 A | 1/1999 | Chen et al. | |
| 5,937,038 A | 8/1999 | Bell | |
| 6,415,257 B1 | 7/2002 | Junqua | |
| 6,606,598 B1 * | 8/2003 | Holthouse | G10L 15/01 |
| | | | 704/236 |
| 7,194,409 B2 | 3/2007 | Balentine et al. | |
| 7,245,291 B2 | 7/2007 | Sharif | |
| 7,260,538 B2 | 8/2007 | Calderone | |
| 2002/0126035 A1 | 9/2002 | Hou | |
| 2003/0014488 A1 * | 1/2003 | Dalal | H04L 29/06 |
| | | | 709/204 |
| 2005/0043956 A1 * | 2/2005 | Aoyama | G10L 15/22 |
| | | | 704/276 |
| 2005/0171775 A1 | 8/2005 | Doyle | |
| 2007/0244705 A1 | 10/2007 | Narita et al. | |
| 2008/0109220 A1 * | 5/2008 | Kiss | G10L 15/26 |
| | | | 704/235 |
| 2009/0094330 A1 | 4/2009 | McQuaide, Jr. et al. | |
| 2009/0293079 A1 | 11/2009 | McKee | |
| 2009/0300680 A1 * | 12/2009 | Cook | H04N 5/44543 |
| | | | 725/44 |
| 2010/0020941 A1 * | 1/2010 | Walker, III | H04M 3/42059 |
| | | | 379/38 |
| 2010/0031143 A1 | 2/2010 | Rao et al. | |
| 2010/0037277 A1 | 2/2010 | Flynn-Ripley et al. | |
| 2010/0169917 A1 | 7/2010 | Harboe et al. | |
| 2010/0263015 A1 * | 10/2010 | Pandey | H04N 21/42203 |
| | | | 725/153 |
| 2010/0278377 A1 * | 11/2010 | Hamel | G10L 15/22 |
| | | | 382/100 |
| 2011/0099596 A1 * | 4/2011 | Ure | H04N 7/17318 |
| | | | 725/106 |

* cited by examiner

METHOD AND APPARATUS FOR SOCIAL NETWORK COMMUNICATION OVER A MEDIA NETWORK

CROSS-REFERENCE TO RELATED APPLICATIONS

This application is a Continuation of and claims priority to U.S. patent application Ser. No. 14/966,574, filed Dec. 11, 2015, now U.S. Patent Publication No. 2016/0099906, which is a Continuation of and claims priority to U.S. patent application Ser. No. 14/339,536, filed Jul. 24, 2014, now U.S. Pat. No. 9,246,868, which is a Continuation of and claims priority to U.S. patent application Ser. No. 13/185,485, filed Jul. 18, 2011, now U.S. Pat. No. 8,825,493. The contents of the foregoing are hereby incorporated by reference into this application as if set forth herein in full.

FIELD OF THE DISCLOSURE

The present disclosure relates generally to a method and apparatus for social network communication over a media network.

BACKGROUND

Media presentation systems allow users to watch television programs, movies, and/or listen to music. Media presentation systems may be stand-alone devices, such as digital video players coupled to televisions, or may be connected to media source providers, such as a cable television provider, a satellite television provider, or an internet protocol television provider. Where media presentation systems are connected to media source providers, the connection may accomplished through public and private networks. Social network applications have become very popular for both recreational and business uses. In social networks, network members can interact with one another over communication networks to share information.

DETAILED DESCRIPTION

Figure 1:
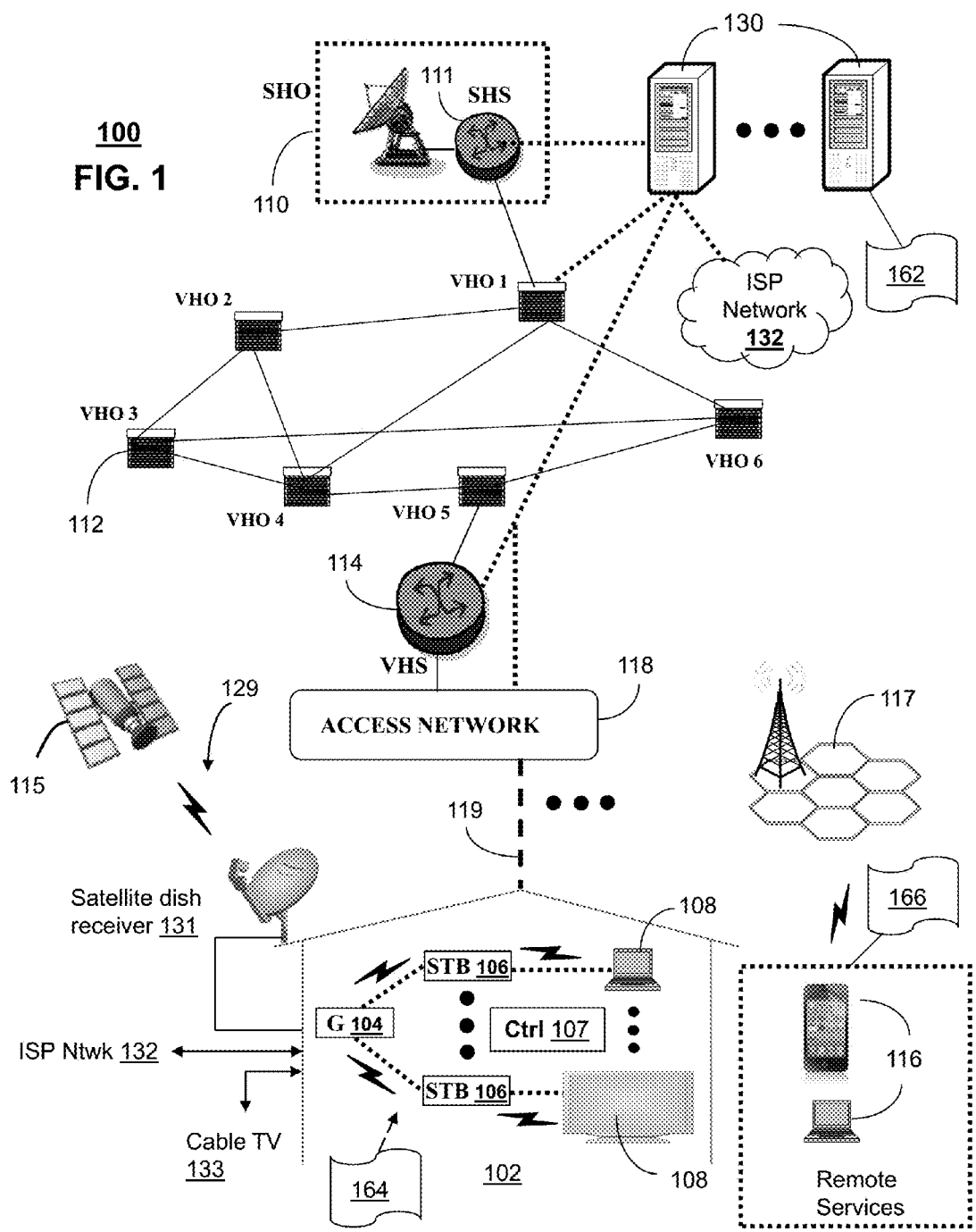
FIGS. 1-2 depict illustrative embodiments of communication systems that provide media services.

The present disclosure describes, among other things, illustrative embodiments for communicating over social networks. One or more of the exemplary embodiments allows a media controller to communicate over a social network. Speech message related to a media program and can be captured by way of the media controller and transmitted in modified formats, such as via a speech-to-text conversion. A speech capturing by the media controller can be adapted based on patterns of prior captured speech so that messages are captured completely and not cut off. Speech patterns can be determined by the device capturing the speech, such as a media controller, and/or by other devices, including a remote server. The speech patterns can be monitored and utilized in conjunction with a user profile. Other embodiments are contemplated by the present disclosure.

One embodiment of the present disclosure includes a device having a memory, a speech capture element for capturing speech messages, a user interface, and a processor. The processor is coupled to the memory, the speech capture element and the user interface. The processor is operable to detect a stimulus at the user interface for initiating a communication session with a member device of a social network to exchange communications, where the communications are associated with a television program presented by way of a media processor communicatively coupled to the processor. The processor is operable to activate the speech capture element in response to the detected stimulus. The speech capturing element remains in the active state for a duration. This duration is independent of a characteristic of the detected stimulus but in accordance with a pattern of prior speech messages captured by the speech capture element. The processor is also operable to transmit a request for initiating the communication session with the member device of the social network, capture a speech message at the speech capture element, and transmit a message representative of the speech message to the member device of the social network.

One embodiment of the present disclosure includes a network element having a processor coupled to a memory. The processor is operable to initiate a communication session between first and second member devices of a social network to exchange communications in relation to a media program. The processor is operable to receive a speech message captured by a speech capture element of the first member device, where the speech capture element is activated independent of a characteristic of a detected activation stimulus of the first member device in accordance with a pattern of prior speech messages captured by the speech capture element. The processor is also operable to transmit a message representative of the speech message to the second member device of the social network.

One embodiment of the present disclosure includes a computer-readable storage medium having computer instructions. The computer instructions are for transmitting a request for initiating a communication session with a member device of a social network to exchange communications. The computer instructions are for activating a speech capture element, where the speech capture element is maintained active independent of a characteristic of the detected stimulus in accordance with a pattern of prior speech messages. The computer instructions are for detecting a speech message at the activated speech capture element and transmitting a message representative of the speech message to the member device of the social network.

This application is related to U.S. patent application Ser. No. 12/848,440, filed Aug. 2, 2010, now U.S. Pat. No. 8,744,860, which issued on May 14, 2014, by Chang et al., entitled "Apparatus and Method for Providing Messages in a Social Network." All sections of the aforementioned application are incorporated herein by reference.

FIG. 1 depicts an illustrative embodiment of a first communication system 100 for delivering media content. The communication system can include a media controller 107 that can communicate with members of social networks of the communication system 100. The media controller 107 can capture and transmit text or audio messages from a user to a social network member and can receive text or audio messages from such a member. A server 130 can be used to initiate and facilitate communication sessions between the media controller 107 and various types of member devices. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106, such as Set-Top Boxes (STBs), which in turn present broadcast channels to media devices 108, such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a social network applications server (herein referred to as remote server 130). The remote server 130 can use common computing and communication technology to perform function 162, which includes among things, controlling communications between one or more media controllers 107, one or more media processors 106, and one or more wireless communication devices 116 connected via a social network. The remote server 103 can also be used to receive, process, and re-transmit speech messages between one or more media controllers 107, one or more media processors 106, and one or more wireless communications devices 116. The remote server 130 can also be used to convert audio speech messages to text messages. The remote server 130 can also be used to control operations of a resource control manager which can operate from a residential gateway 104, a media processor 106, or other computing devices in building 102. The media processors 106 and wireless communication devices 116 can be adapted with software functions 164 and 166, respectively, to further utilize the services of the remote server 130. In one embodiment, functions 162, 164 and/or 166 can include analyzing speech of a user to determine a speech pattern. The pattern can be provided to a user profile associated with the user.

Figure 2:
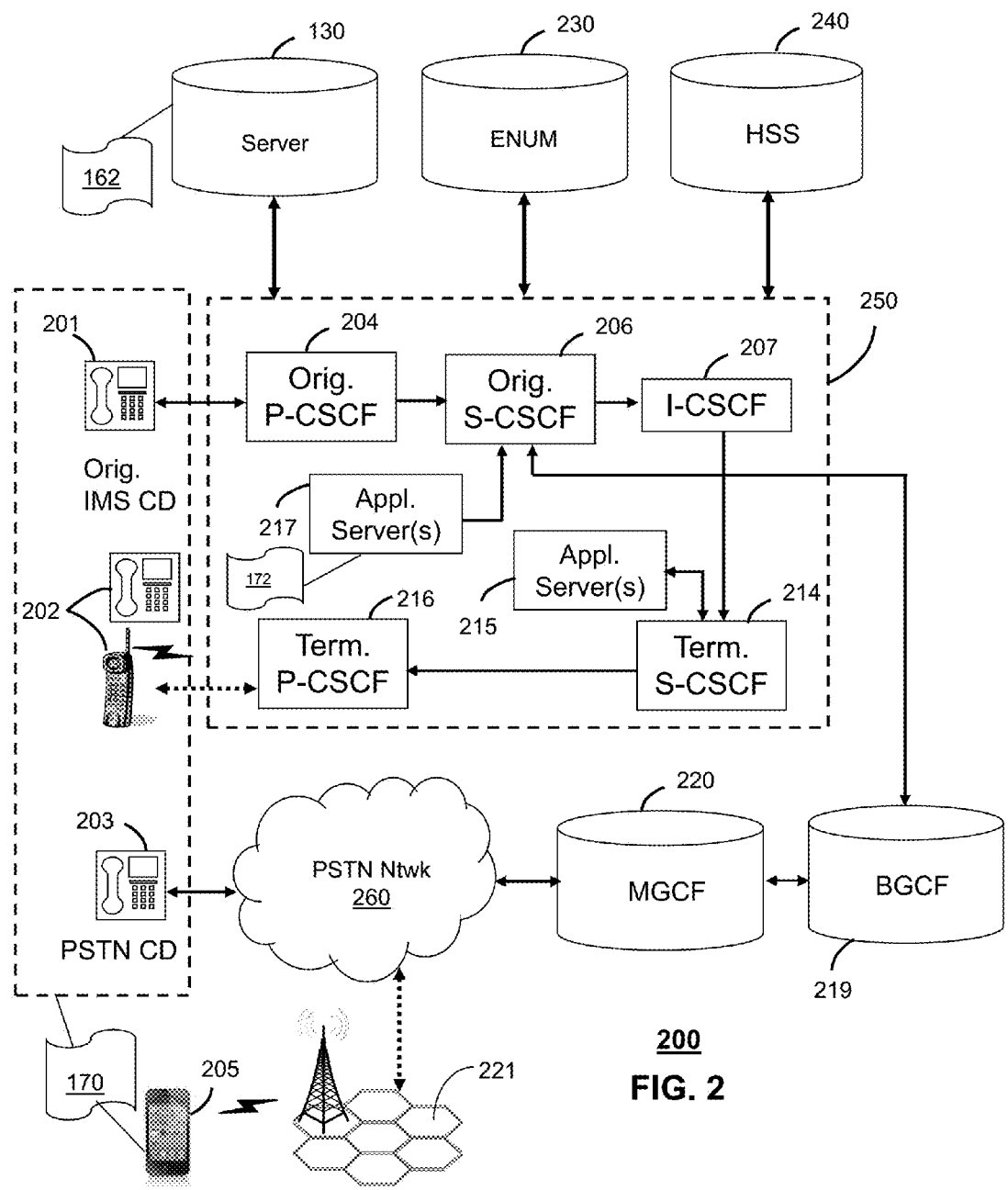

FIG. 2 depicts an illustrative embodiment of a communication system 200 employing the IP Multimedia Subsystem (IMS) network architecture to facilitate the combined services of circuit-switched and packet-switched systems. Communication system 200 can be overlaid or operably coupled with communication system 100 as another representative embodiment of communication system 100. The communication system 200 can include a server 130 that can be used to initiate and facilitate communication sessions, including providing text-to-audio conversion, between a media controller and various types of member devices.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

The remote server 130 of FIG. 1 can be operably coupled to the second communication system 200 for purposes similar to those described above. It is further contemplated by the present disclosure that remote server 130 can perform function 162 and thereby provide social network applications services to CDs 201, 202, 203, and 205 of FIG. 2. It is further contemplated by the present disclosure that remote server 130 can perform function 162 and thereby control communications via a social network for the CDs 201, 202, 203 and 205 of FIG. 2. CDs 201, 202, 203 and 205 can be adapted with software to perform function 170 to utilize the services of the remote server 130. It is further contemplated that the remote server 130 can be an integral part of the application server(s) 217 performing function 172 which can be substantially similar to function 162 and adapted to the operations of the IMS network 250.

Figure 3:
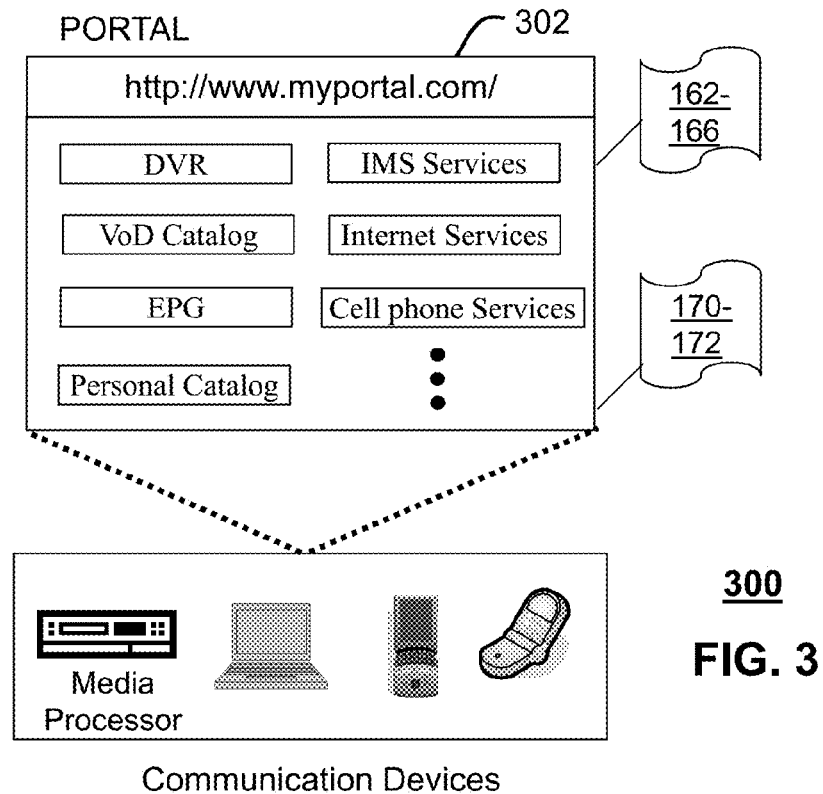
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. The web portal 302 can manage and provision software applications for enabling a media controller 107 to communicate with members of social networks of the communication system 100. The media controller 107 can capture and transmit text or audio messages from a user to a social network member and can receive text or audio messages from such a member. A server 130 can be used to initiate and facilitate communication sessions between the media controller 107 and various types of member devices. A web page of the web portal 302 can be accessed by a Uniform Resource Locator (URL) with an Internet browser such as Microsoft's Internet Explorer™, Mozilla's Firefox™

Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162, 164, 166 of a remote server, a media processor, and a wireless communication device, respectively, as described earlier.

Figure 4:
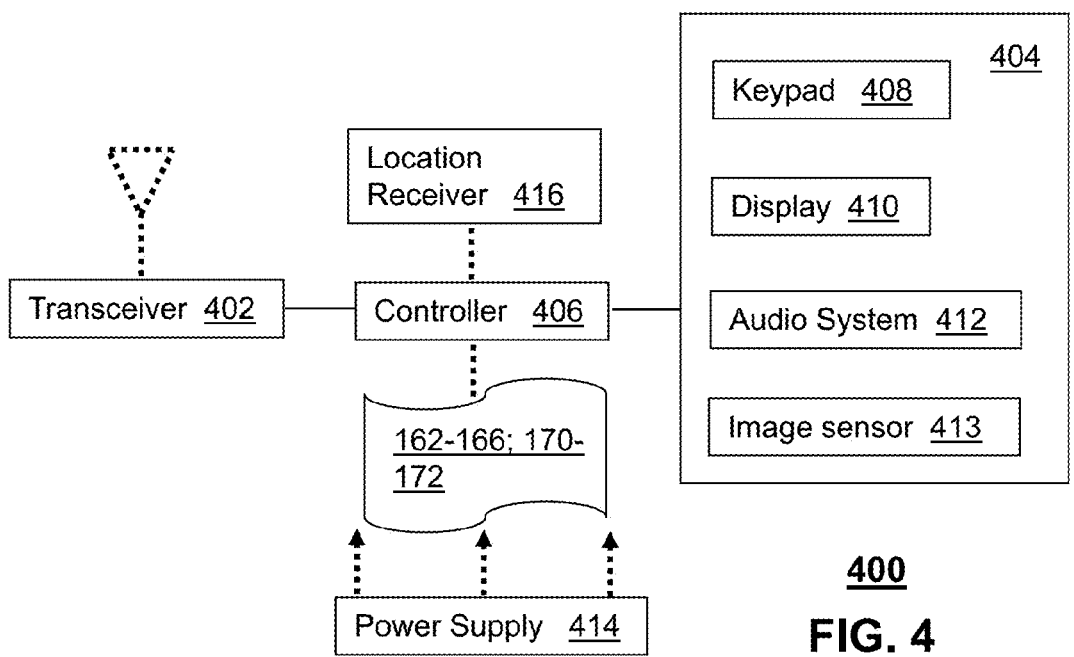
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include a single button to activate, de-activate, or toggle between activation and deactivation of the microphone. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can operate as a remote server from which a social network applications server operates as described below. It follows from these illustrations that the controller 406 can be adapted in various embodiments to perform the functions 162, 164, 166 of the remote server, a media processor, and a wireless communication device, respectively.

Figure 5:
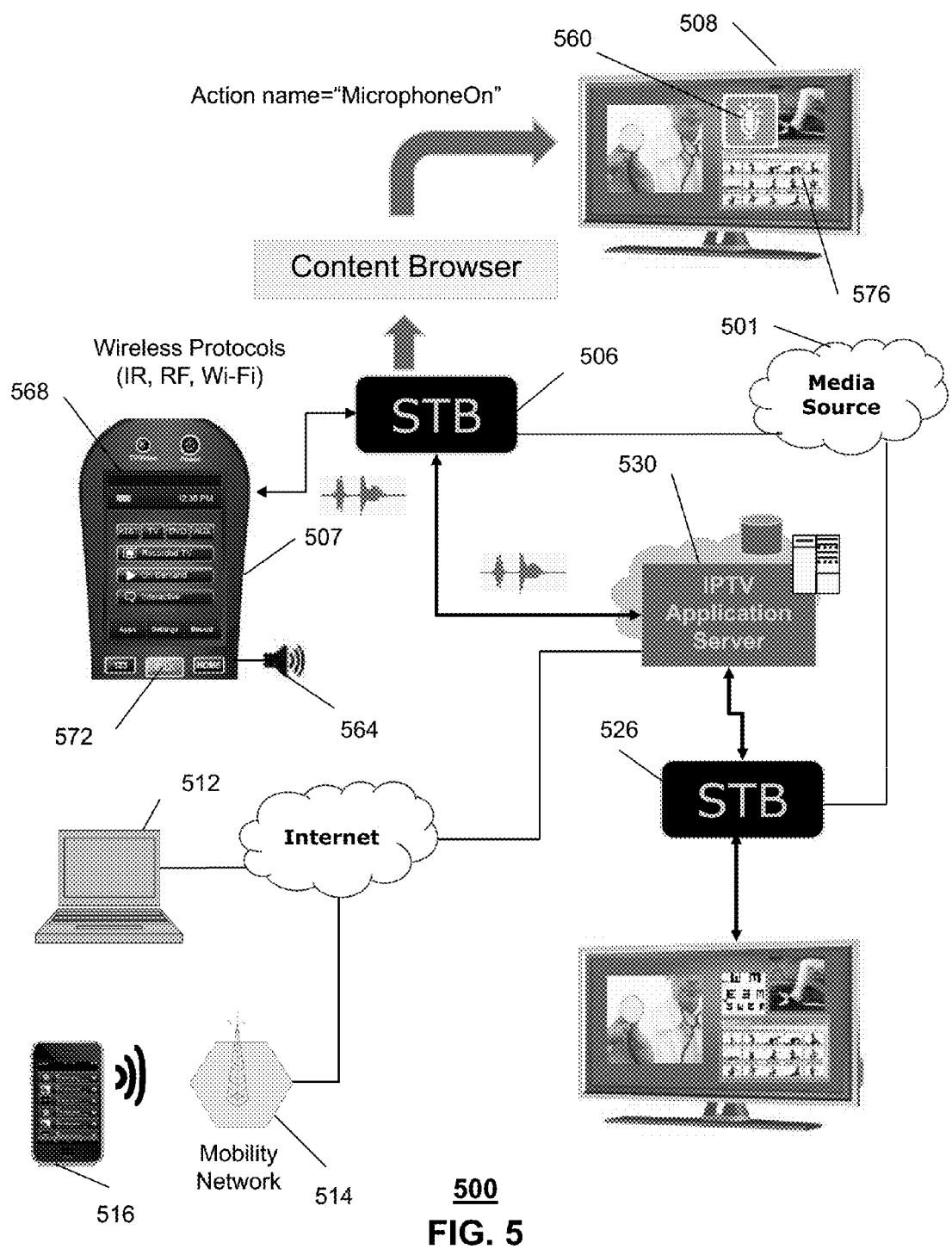
FIG. 5 depicts and illustrative embodiment of a system for social network communication of a media network.

FIG. 5 depicts an illustrative embodiment of a system 500 for communication with social networks, including wireless communication. System 500 can be overlaid or operably coupled to communication systems 100-200 as another representative embodiment of communication systems 100-200. System 500 can include a remote server 530 in communication with media controllers 507 (such as remote controllers), media processors 506, 526 (such as set-top boxes), computing devices 512 (such as a laptop computer, tablet, etc.), and wireless communication devices 516 (such as mobile phones, smart phones, etc.). The STBs 506, 526 can receive media content from a media source 501. The media source 501 can represent at least one of communication systems 100-200 in whole or in part. The mobile devices 516 can be communicatively coupled to the remote server 530 by way of a mobility network 514 coupled to the Internet or other communication means. The computing devices 512 can also be communicatively coupled to the remote server 530 by way of the Internet or other communication means.

Figure 6:
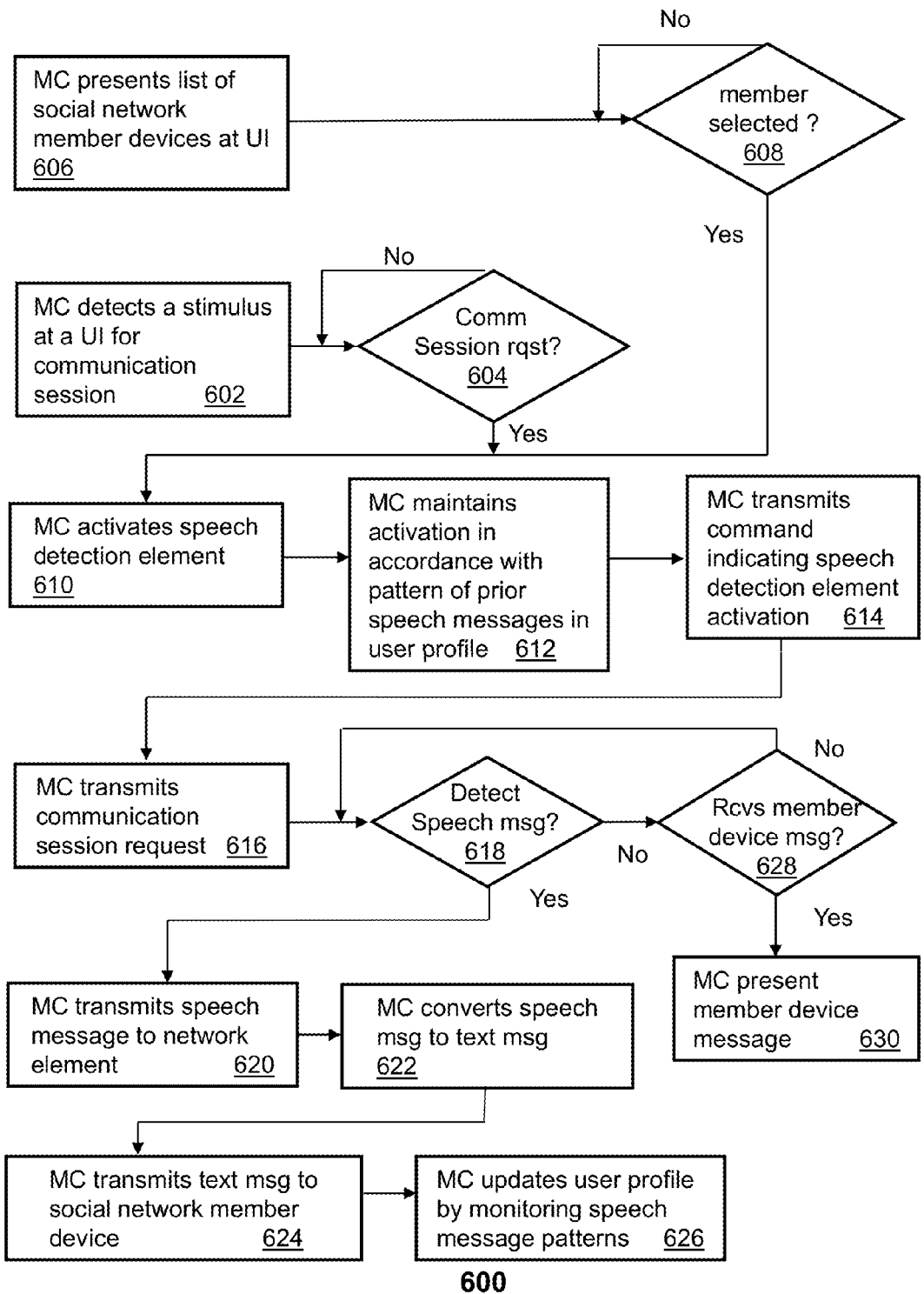
FIG. 6 depicts an illustrative embodiment of a method operating in portions of the systems described in FIGS. 1-5.
Figure 7:
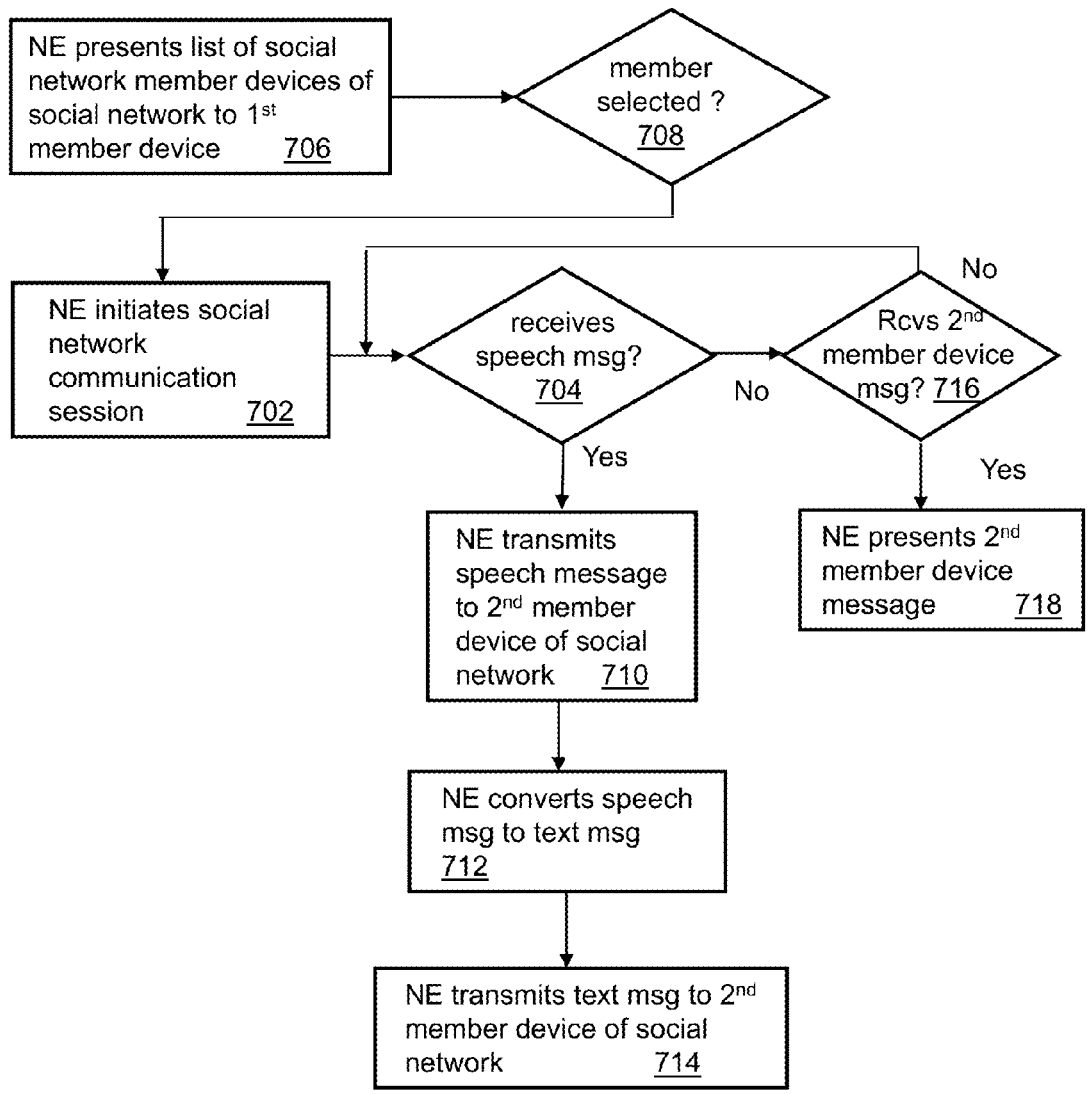
FIG. 7 depicts an illustrative embodiment of a method operating in portions of the systems described in FIGS. 1-5.

The present disclosure contemplates a remote server 530 that, among other things, is capable of controlling communications between a media controller 507, media processors 506, 526, wireless communication devices 516, and/or computing devices 512 coupled on a network according to the illustrative embodiments of methods 600-700 of FIGS. 6-7.

The remote server 530 can also enable, in whole or in part, communication sessions between member devices of a social network. For example, the media controller 507, through a first media processor 506, can be a member device of a social network application running on the remote server 530. Other network devices, such as a second media processor 526, wireless communication device 516, and/or computing device 512, can be additional members of the social network. As such, the media controller 507 can communicate bi-directional messages to the other member devices. The remote server 530 can further enable use of the media controller 507 as a user interface for communications sessions for voice, video and/or text messaging. The media controller 507 can command the media processor 506 to indicate on a display 508 an icon image 560 corresponding to an activate state of speech capture by speech capturing means, such as of the media controller 507, the media processor 506 or another device.

The media controller 507 can include a speaker device 564. The speaker device can reproduce converted text messages, as well as audio and video messages, from other member devices 512, 514, 526 of a social network. A TALK button 572 on the media controller 507 can be used to activate speech capture on the media controller 507. The TALK button 572 can also be used to toggle the state of media controller 507 from speech capture (microphone ON) to mute (microphone OFF). The TALK button 572 can further cause the media controller 507 to generate and send commands to the media processor 506 to toggle states of the icon image 560 corresponding to speech capture and mute states for the media controller 507. The icon image 560 can be controlled by the media processor 506 and can be presented on a message window 576 of the display 508.

The media controller 507 can include a controller display 568. The controller display 568 can be used to present button press information. The controller display 568 can also be used to present programming selection received from the media processor 506. The controller display 568 can further be used to present text messages received by the media controller 507. For example, where them media controller 507 is operating in a communication session with any of the other members 512, 514, 526 of a social network, one of those members can transmit to the media controller 507 a text message by way of the remote server 530 and the media processor 506. The media controller 507 can receive these text messages and present the text on the controller display 568.

Figure 8:
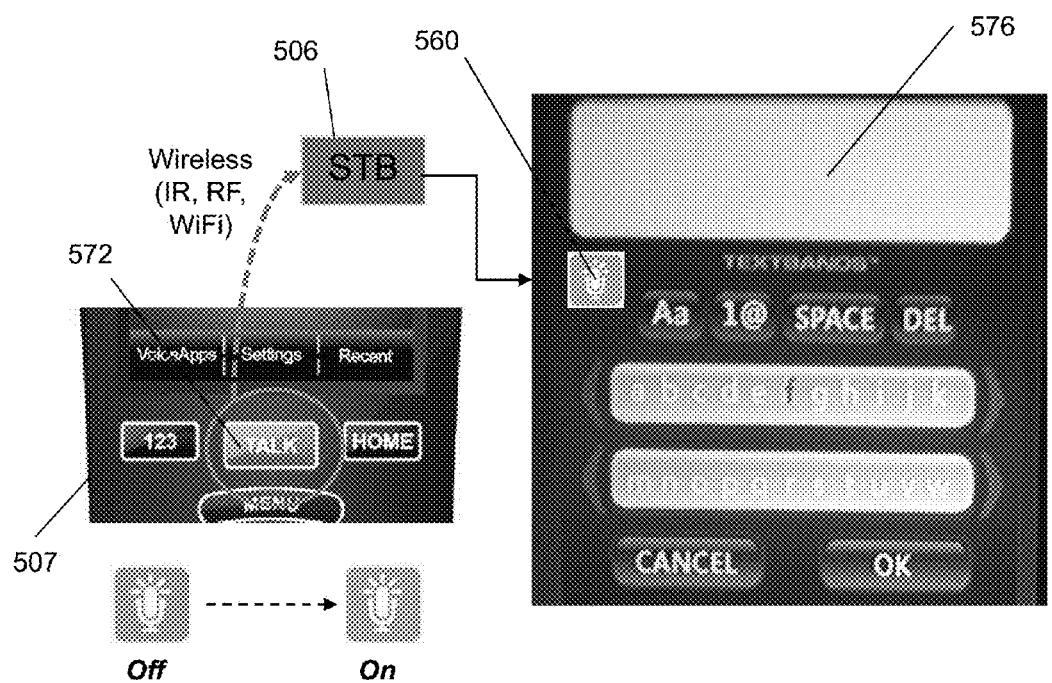
FIGS. 8-10 depict illustrative embodiments of a system for social network communication of a media network.
Figure 9:
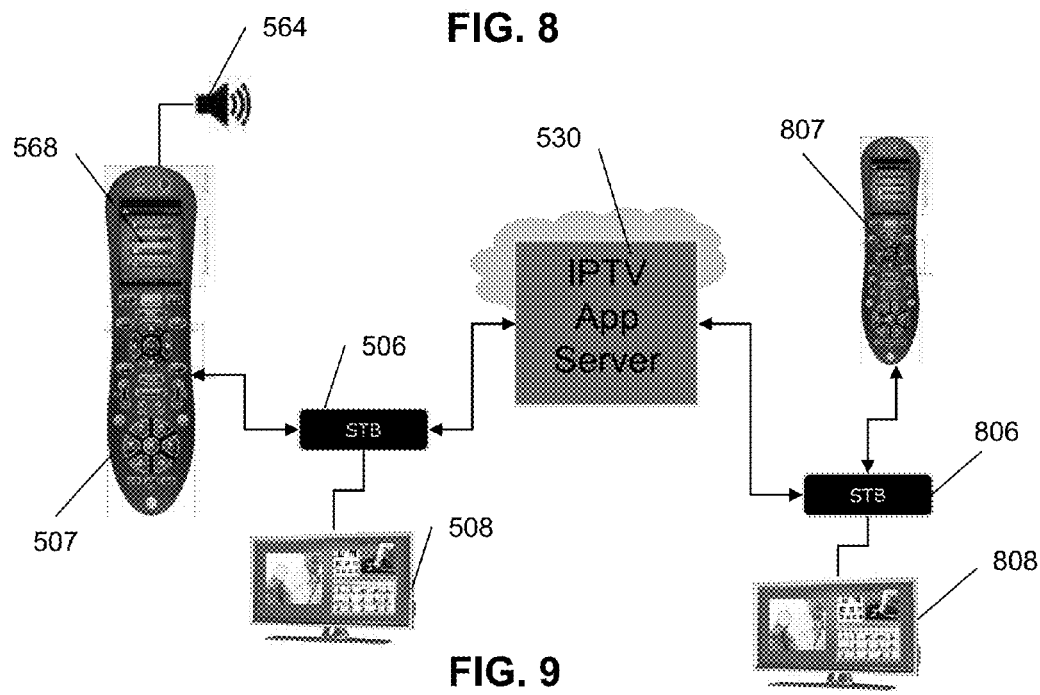
Figure 10:
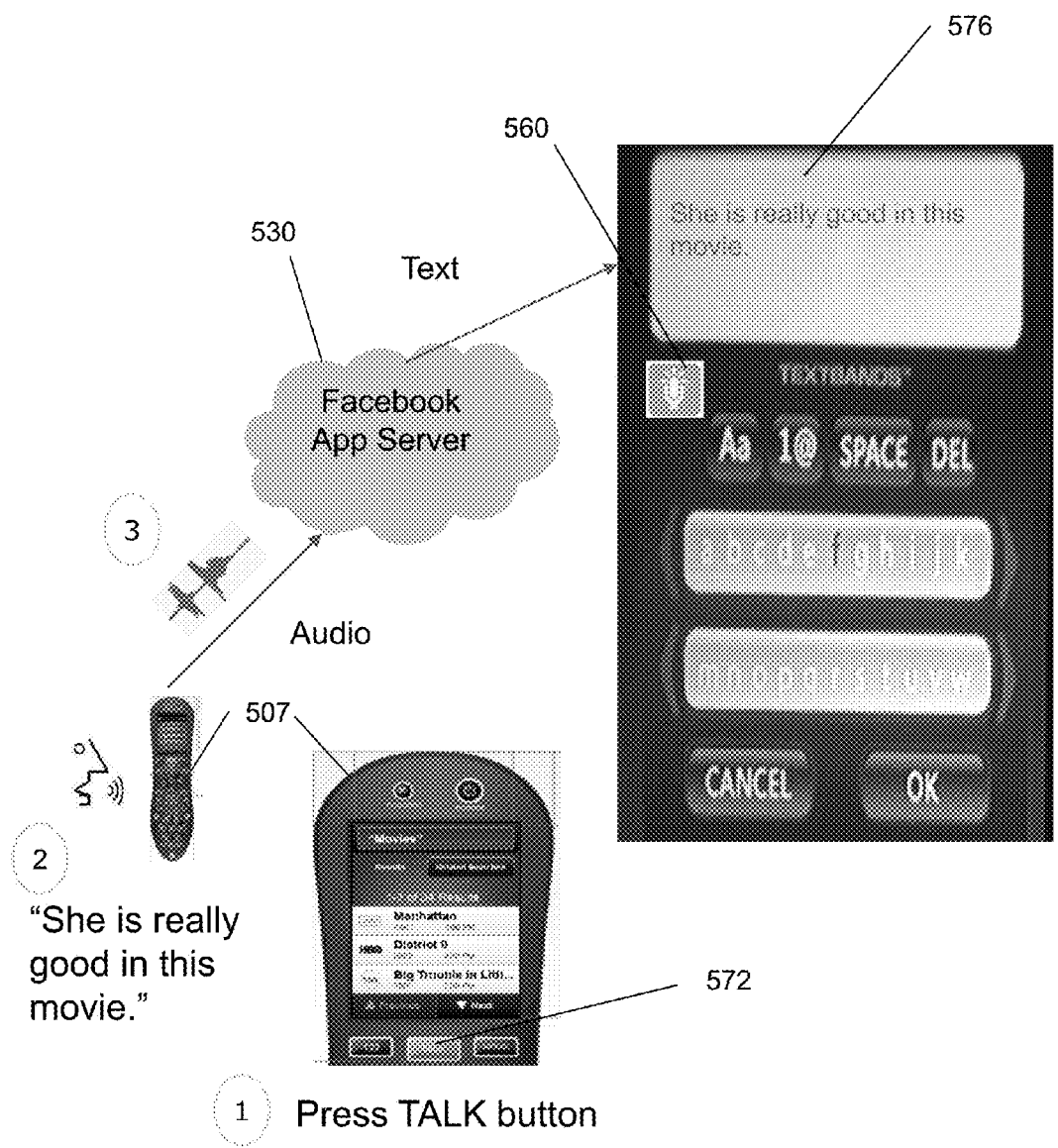

FIG. 6 depicts an illustrative method 600 that operates in portions of the devices of FIGS. 1-5 and in portions of the systems of FIGS. 8-10. Method 600 can begin with step 602, in which the media controller 507 (MC), such as a remote control device, can be adapted to detect a stimulus at a user interface (UI) of the media controller 507. The detected stimulus can be used for initiating a communication session with a member device of a social network to exchange communications. The stimulus can be a pressing of a mechanical keypad, a touching of a touch-sensitive display, or a manipulation of a roller ball, joystick, mouse, or navigation disk of the UI of the media controller 507, as well as other means for presenting a stimulus to a user interface. The stimulus can be a selection of a specialized button, such as a TALK button 572 on the media controller 507. The stimulus can be a selection, via the media controller, of an object, word, or command presented by the media processor 506 on a display 508.

The communication session associated with the stimulus can be a connection established between the media controller 507 and any communication device coupled to the remote server 530 through a public network connection, a private network connection, or a wireless connection. The member device of the social network can be a media processor 526, a computing device 512, or a wireless communications device 516 that is accessible through the remote server 530 over a private or public network. The member device of the social network can be associated with a recreational social network, such as Facebook™, operated by the Facebook Corporation of Palo Alto, Calif., or Twitter™, operated by Twitter, Inc., of San Francisco, Calif., or a business meeting and desktop sharing social network, such as Go-To-Meeting™, operated by Citrix Online, a division of Citrix Systems, Inc., of Goleta, Ga. The member devices can be associated with a single service provider or with different service providers.

Communications can be exchanged between the media controller 507 and a member device 512, 514, 526 through a social network. The remote server 530 can be adapted to execute and/or access a social network application for controlling communications between the media controller 506 and the associated social network member device. The exchanged communications can be in relation to or associated with a media program, such as a television program, a video program, an audio program, or an on-demand program. The media program can be presented by the media processor 506 that is communicatively coupled to the media controller 507. The media program can further be supplied to the media processor 506 by a public or private network, by a subscription-based service, and/or by an on-demand service.

In step 604, the media controller 507 can be adapted to monitor stimulus to the media controller 507. Stimulus to the media controller 507 can represent commands to the media processor 506 directing the media processor 506 to perform local functions such as changing channels, changing volume, navigating a program guide, reviewing or editing a user set-up, or controlling media recording and playback functions. A stimulus to the media controller 507 can be associated with a command to media processor 506. For example, pressing a button on the keypad of the media controller 507 can be result in a command for the media processor 506 to request a communication session between the media controller 507 and a member device of a social network.

In another embodiment, the media controller 507 can be adapted to present a list of social network member devices at the user interface of the media controller 507. The list of social network member devices 512, 514, 526 can be a "buddy" list of users, associated with member devices of a social network, where the users are known to a user of the media controller 507. The list of social network member devices can be a listing of names, nicknames, identifying numbers, addresses, networking addresses, or device identification codes. The list of social network member devices can be adapted to include the names of social network sites, website links, and hyperlinks. If a member device 512, 514, 526 of the list is selected in step 608 or if the stimulus is detected corresponding to a request for a communication session with a member device in step 604, then media controller 507 can proceed in step 610 to activate a speech capture element, such as of the media controller 507, responsive to the detected stimulus. The speech capture element can be a microphone. The microphone can be integrated into the media controller 507 or can be a discrete microphone coupled to the media controller 507. The activation of the speech capture element can be accomplished by enabling a power supply or power supply path to the speech capture circuit, by enabling a signal path of the speech capture element, and/or by enabling of an audio speech capturing function coupled to the speech capture element.

In step 612, the media controller 507 can maintain the activated speech capture element in the activation state in accordance with a pattern of prior speech messages, such as in a user profile. The media controller 507 can be adapted to access the user profile including prior speech message timing information. The prior speech message timing information can include data indicating durations of time between a time point when a detected stimulus results in activation of the speech capture element and a time point when a user of the media controller stops speaking. For example, the detected stimulus can be a selection of a TALK button or a selection of a member device from a listing. A resulting action of the media controller 507 in response to the detected stimulus can be an activation of the speech capture element. Upon activation, the microphone is capable of capturing audio signals when the user begins speaking. The media controller 507 can be adapted to capture the speech message by, for example, digitally recording and temporarily storing a digital audio stream. When the user stops speaking, the media controller 507 can be further adapted to detect a time point reflecting the end of the speech message. An elapsed time period, between a first time point of an initial activation event and a second time point of an end of the speech message, can be stored for multiple prior speech messages. Elapsed time periods for multiple prior messages can be stored as a pattern of prior speech messages. The stored pattern of prior speech messages can be further processed to calculate a duration of time during which the speech capture element should be maintained in an active state such that audio from the user can be captured for inclusion in the speech message for optimal times. A short speech capture time period can result in the media controller 507 losing of part of the speech message. A long speech capture time period can result in capturing long periods of non-speech content that can cause a waste of system resources and bandwidth.

The media controller 507 can be adapted to store a separate user profile with a pattern of prior speech messages for each user of the media controller 507. The media controller 507 can be adapted to maintain the active state of the speech capture element independent of a characteristic of the detect stimulus. For example, the detected stimulus can be a pressing of a keypad of the media controller 507. The media controller 507 can be adapted to maintain the speech capture element in an active state regardless of whether the keypad is continuously pressed, is momentarily pressed, and/or is pressed multiple times. The media controller 507 can be adapted to maintain the speech capture element in an active state for a time period after keypad pressing or selection has ended. In one embodiment, the media processor 506 and/or the remote server 530 can be adapted to store a user profile and to provide a pattern of prior speech message timing information to the media controller 507 for use in determining a microphone activation time. In another embodiment, a default time period for maintaining the active state of the speech capture element can be utilized in the absence of a prior speech pattern for the user.

In step 614, the media controller 507 can be adapted to transmit a command to indicate an activation of the speech capture element. For example, the media controller 507 can be adapted to send a command to a media processor 506 to indicate that the speech capture element has been activated. The media processor 506 can be adapted to present on a display 508 an image 560 corresponding to an activate state (active or inactive) for the speech capture element of the media controller 507. Referring to FIG. 8, a selection of the TALK button 572 of the media controller 507 is depicted. In response, the media controller can send a message to the media processor 506 by, for example, IR, RF, or WiFi communication, indicating a change in activation status (active or mute) for the capture of speech by the media controller 507. The media processor 506 can, in turn, toggle a state of an image icon 560 on a message window 576 of the display.

Referring again to FIG. 6, in step 616, the media controller 507 can transmit a request for initiating a communication session with the member device 512, 514, 526 of the social network. The communication session can be a social network application for which the member device is authorized. The communication session can be a series of communication between the media controller 507 and the member device of the social network. The request for initiation can be sent to the media processor 506 and, later, forwarded to the remote server 530. The remote server 530 can be adapted to execute a social network application.

In step 618, the speech capture element can be monitored to detect any speech message. For example, the output of the speech capture element can be sampled and filtered by the media controller 507 to remove spurious noise outside the frequency range of human speech. The filtered signal can then be analyzed to see if there is any speech in the filtered signal content. If a speech message is detected at step 618, then the speech message can be captured and transmitted to the member device 512, 514, 526 of the social network in step 620. The speech capture element is held active for the duration period beginning with the detection of the speech content. The media controller 507 or the media processor 506 can be adapted to monitor for any speech message captured by the speech capture element and to forward the captured speech message to the member device. The media controller 507 can be adapted to send the entire speech message to the media processor 506 only when the activation time has expired. In another embodiment, the media controller 507 can be adapted to stream the speech message to the media processor 506 as it is received, without waiting for the entire message to complete. The media controller 507 can be adapted to transmit a digital encoding of the speech content and can be adapted to compress the digital stream or encode the digital stream by way of a MPEG format or a wave format. The media controller 507 (or the STB 506, or the IPTV Application Server 530) can be adapted to covert the speech message from an audio signal speech message to a text speech message in step 622 as depicted in FIG. 10.

Referring again to FIG. 6, the audio-to-text conversion can be performed, for example, by hidden Markov modeling (HHM) or by dynamic time warping (DTW). In step 624, the media controller 507 transmits the derived text message to a social network member device. The media controller 507 can send an audio speech message, a text message derived from an audio speech message by audio-to-text conversion, or both. The text message can be sent to the media processor 506 for forwarding to a social network member device through the remote server 530.

In step 626, the media controller 507 can update the user profile with a pattern of prior speech messages. The media controller 507 can be adapted to append an elapsed time, between activation of the speech capture element and an end of the speech message, to a data set collecting multiple such elapsed times. The media controller 507 can be further adapted to calculate a new activation time period, such as based in part on the last elapsed time, for further storage in the user profile.

In step 628, the media controller 507 can receive a message from the social network member device 512, 514, 526. For example, after a social networking communication session is established between the media controller 507 and a member device 512, 514, 526 of the social network, the member device can send a message to the media controller 507 by way of the remote server 530. The remote server 530 can also be adapted to receive a communication message from the member device and to forward this message to the media controller 507. If such a member device message is received by the media controller 507, in step 628, then the media controller 507 can be adapted to present the member device message on a display 508 in step 630. For example, the message can be sent by the remote server 530 through a media processor 506 that is coupled to the display 508. A member device message received at the media controller 507, such as a text message, can also be displayed on the controller display 568 of the media controller 507. Where a member device message received at the media controller 507 is an audio message, this message can be reproduced by the media controller 507 using a speaker 564.

The media controller 507 and a member device 512, 514, 526 can form a mutual selection when a communication session is initiated. This communication session can support bi-directional communication between the media controller 507 and the member device. Referring to FIG. 9, a portion of a system is depicted including a media controller 507, a media processor 506, and a display 508, a remote server 530, and a second media controller 807, a second media processor 806, and a second display 808. A social networking communication session can be established between the media controller 507 and the secondary media processor 806 or the secondary media controller 807. By way of example, there can be several possible combinations of the audio/visual events that can occur at either, or both, location of the media processor 507 and the secondary media processor 808. An audio message/alert can be played on either display 508, 808. A visual icon or picture-overlay is presented on either display 508, 808. A combination of both an audio message/alert and a visual icon can be displayed. An audio message/alert can be reproduced on the first media controller 507. A graphics icon or a low bit-rate animation can be played on a controller display 568 of the media controller 507. A combination of both an audio message/alert and a graphics icon or animation may be presented by the media controller 507. An audio alert can be reproduced on the media controller 507 and/or on the display 508. A visual or picture overlay can be presented on the display 508 or on the controller display 568 of the media controller 507.

The audio message/alert on the media controller 507 can provide a function similar to a "ringing tone" of a cellphone world. For example, a first user member at media controller 507 can select a second user member associated with the secondary media processor 806 by using the media controller 507 and the display 508. The first user member can then begin watching a basketball game on the display 508. Later, the second user member presses a TALK button on his media controller 807 and then submits a "voice posting" on his personal social networking page. The first user member can, in turn, receive an audio alert on his media controller 507 to "privately" notify him or the second user member's new posting (without letting anyone else in the room know). The first user member can respond to the audio alert message by, for example, pressing an on-screen button, such as "More Info," on the media controller 507. The media controller 507 can then receive a more detailed message about the status of the second user member, such as "he is watching Stanley Cup".

FIG. 7 depicts an illustrative method 700 that operates in portions of the devices of FIGS. 1-5 and in portions of the systems of FIGS. 8-10. Method 700 can be used in conjunction with one or more steps of method 600. Method 700 can begin with step 702, in which a network element, such as one or more of computing devices 130 of FIG. 1, initiates a communication session between first and second member devices of a social network. The network element can be the media processor 506 coupled to the media controller 507 and/or can be the remote server 530 coupled to the media controller 507 through the media processor 506. The first member device of the social network can be the media controller 507 that is coupled to the remote server 530. The second member device of the social network can be the media processor 506, the computing device 512, or the wireless communications device 516 that is accessible through the remote server 530. The communication session can be a connection established between the media controller 507 and any communication device coupled to the remote server 530 through a public network connection, a private network connection, or a wireless connection. The first and second member devices of the social network can be associated with a recreational social network. Communications can be exchanged between the media controller 506 and the member device through a social network. The remote server 530 can be adapted to execute the social network application to enable the communications between the media controller 507 and the member device of the social network. The exchanged communications can be in relation to a media program, such as a television program, a video program, an audio program, or an on-demand program. The media program can be presented by the media processor 506 that is communicatively coupled to the media controller 507. The media program can be supplied to the media processor 506 by a public or private network, by a subscription-based service, and/or by an on-demand service.

In step 704, the network element can monitor the speech capture element to determine if a speech message has been captured. The network element can receive a speech message captured by a speech capture element of the first member device. For example, the media controller 507 can be adapted to capture an audio speech message with a speech capture element and to transmit the speech message to the network device. The speech capture element can be a microphone. The microphone can be integrated into the media controller 507 or can be a discrete microphone that is coupled to the media controller 507. The activation of the speech capture element can be accomplished, for example, by enabling a power supply for the speech capture circuit, by enabling a signal path for the speech capture element, and/or by enabling of a signal capturing function coupled to the speech capture element.

The speech capture element can be activated by the media controller 507 such that the period of activation is independent of a characteristic of a detected activation stimulus of the first member device. That is, although the period of activation for speech capture can be begin with a detected pressing of the TALK button, the length of the speech capture activation can be made to continue for a period that is independent of when the TALK button is un-pressed. In this way, the media controller can create an activation period that is adapted to speech patterns of the user. Once activated, the speech capture element activation can be maintained by the media controller 507 in accordance with a pattern of prior speech messages captured by the speech capture element. For example, the media controller 507 can be adapted to access a user profile including prior speech message timing information. The prior speech timing information can include data indicating elapsed time between a time point when a detected stimulus that results in activation of the speech capture element and a time point when a user of the media controller 507 stops speaking. For example, the detected stimulus can be the selection of a TALK button or the selection of a member device from a listing. The resulting action of the media controller 507 can be an activation of the speech capture element. Upon activation of the speech capture element, the speech capture element can be capable of capturing an audio signal corresponding to the user's speech. The media controller 507 can be adapted to capture the speech message by, for example, digitally recording and temporarily storing a digital audio stream. When the user stops speaking, the media controller 507 can detect the end of the speech message. An elapsed time between the stimulus activation event and the end of the speech message can be stored as a pattern of prior speech messages. The stored prior speech message data can be further processed to calculate an elapsed time during which the speech capture element should be maintained in the active state such that audio from the user can captured for inclusion in the speech message without leaving the speech capture element active for too short of a time period (thereby losing part of the speech message) or for too long of a time period (thereby wasting system bandwidth).

The media controller 507 can be adapted to store a separate user profile with a pattern of prior speech messages for each user of the media controller 507. The media controller 507 can be adapted to maintain the active state of the speech capture element independent of a characteristic of the detect stimulus. For example, the detected stimulus can be a pressing of a keypad of the media controller 507. The media controller 507 can be adapted to maintain the speech capture element in an active state independent of whether the keypad is continuously pressed, is momentarily pressed, or is pressed multiple times. The media controller 507 can be adapted to maintain the speech capture element in an active state for a time after keypad pressing or selection has ended. In one embodiment, the media processor 506 and/or the remote server 530 can be adapted to store the user profile or to provide the pattern of prior speech message timing information to the media controller 507 for use in maintain the activation for the proper time. Adapting the control of the speech capturing element activation time can be useful for improving the quality and accuracy of the captured speech while minimizing use of system resources.

In another embodiment, the network element can be adapted to present a list of social network member devices a display at step 706. For example, the network element can be the media processor 506 that is adapted to present the list at the display 508. The list of social network member devices can be a "buddy" list of users, associated with member devices of a social network, where the users are known to a user of the media processor 506. The list of social network member devices can be a listing of names, nicknames, identifying numbers, addresses, network addresses, or device-identifying codes. The list of social network member devices can be adapted to include names of social network sites, website links, and hyperlinks. If a member device of the list of social network member devices is selected in step 708, or if a request is initiated for a communication session with a member device in step 704, then the media controller 507 can proceed to step 710.

In step 710, the network device can transmit the received speech message to a second member device of the social network. In step 712, the network element can be adapted to covert the received speech message from an audio signal into a text message in step 622. The audio-to-text conversion can be performed, for example, by hidden Markov modeling (HHM) or by dynamic time warping (DTW). The network element can send both the audio speech message and the text message derived from the audio speech message by audio-to-text conversion. The audio-to-text conversion can be accomplished within the media controller 507, the media processor 506, and/or the remote server 530. In step 714, the network element can transmit the derived text message to the second member device of the social network.

In step 716, the network element can monitor to determine if a social network message has been received from the second member device. For example, after a social networking communication session is established between the media controller 507 and the second member device, the second member device can send a message(s) to the media controller 507 through the network element. The remote server 530 can be adapted to receive the message and to forward the message(s) to the media controller 507. Also, if the message (s) is received by the network element in step 716, then the network element can be adapted to present the member device message on a display 508. For example, the message can be sent through the media processor 506 to the display 508.

Upon reviewing the aforementioned embodiments, it would be evident to an artisan with ordinary skill in the art that said embodiments can be modified, reduced, or enhanced without departing from the scope and spirit of the claims described below. In one embodiment, detection of a stimulus at the user interface of the media controller 507 causes the media controller to send a specific key code to the media processor 506. The media processor 506 can respond to reception of the specific key code by generating an event code for an internet protocol television application showing on a display communicatively connected and controlled by the media processor 506. The media processor 506 can be further adapted to present or animate an object on the display in response to the specific key code. In another embodiment, a media controller engaged in a communication session with a member device of a social network can be adapted to display text messages received from the member device. In another embodiment, the media controller can be adapted to detect an audio queue as the stimulus for initiating a communication session with a member device of a social network. For example, a special word, sound, or voice can be detected by the media device 507 and caused the media device to request initiation of the communication session.

In another embodiment, the media controller 507 can be adapted to convert audio speech messages to text messages. The media controller 507 can be further adapted to send commands to the media processor 506 based on the resulting text messages. In another embodiment, the media processor 506 can be adapted to modify an object presented on a display, where the modification without affecting the display of media content. Other embodiments are contemplated by the present disclosure.

Figure 11:
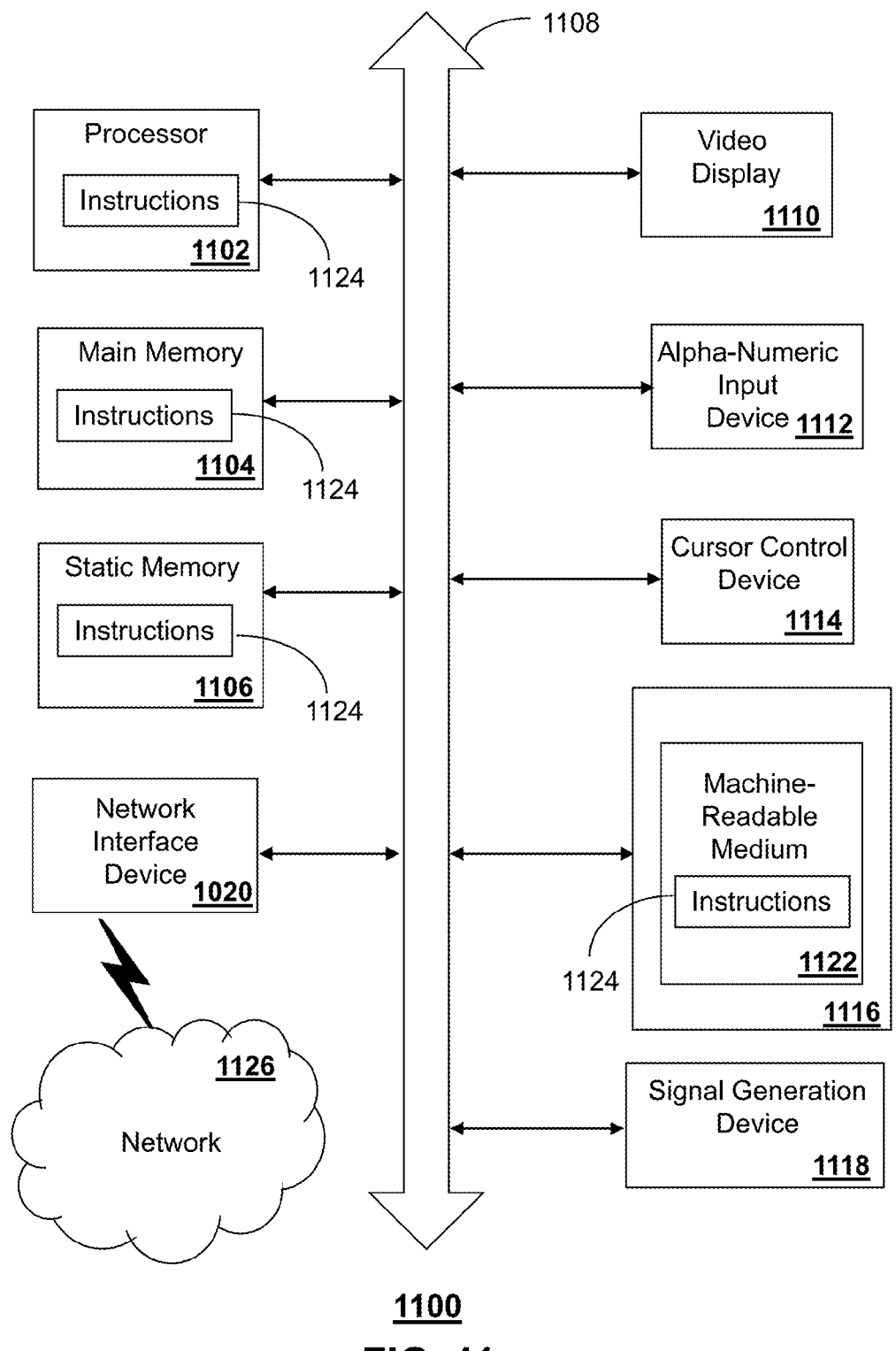
FIG. 11 is a diagrammatic representation of a machine in the form of a computer system within which a set of instructions, when executed, may cause the machine to perform any one or more of the methods discussed herein.

FIG. 11 depicts an exemplary diagrammatic representation of a machine in the form of a computer system 1100 within which a set of instructions, when executed, may cause the machine to perform any one or more of the methods discussed above. One or more instances of the machine can operate, for example, as the remote server 530, the media processor 506, the gateway 104, and the media controller, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, or a solid state display. The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
receiving a selection from among a list of members of a social network;
initiating a communication session based on the selection, wherein the communication session includes exchanging communications between a user and a member communication device, wherein the user and the member communication device are associated via the social network, and wherein the social network comprises a social network application which has selective accessibility for member devices and which is managed by a social network server;
capturing an input speech message according to a determination of a pattern of prior speech messages of the user;
appending a speech capture time period to a data set comprising elapsed speech times; and
transmitting, to the member communication device, a message representative of the input speech message.

2. The device of claim 1, wherein the operations further comprise determining the speech capture time period based on a time between: an activation of the initiating the communication session, and a period after detecting that the user has stopped speaking, wherein the determining of the speech capture time period is according to the determination of the pattern of prior speech messages of the user.

3. The device of claim 1, wherein the communications are associated with a television program which is presented by way of a media processor, wherein the media processor is communicatively coupled to the processor, and wherein the device comprises one of a remote controller or a mobile communication device.

4. The device of claim 1, wherein the operations further comprise transmitting a command to a media processor, and thereby indicating an activation state of a speech capture element.

5. The device of claim 4, wherein the speech capture element is maintained, for a length of time equal to the speech capture time period, in an active state, and wherein the active state is independent of the selection.

6. The device of claim 1, further comprising a display, and wherein the operations further comprise: receiving, from the member communication device, a text message; and
presenting, on the display, the text message.

7. The device of claim 1, further comprising a speaker, and wherein the operations further comprise: receiving, from the member communication device, an audio message; and reproducing, via the speaker, the audio message.

8. The device of claim 7, wherein the operations further comprise presenting the list of members.

9. The device of claim 1, wherein the operations further comprise:
receiving a group of messages generated by the member communication device; and
presenting the group of messages, wherein the group of messages generated by the member communication device are received from the social network server.

10. A network element, comprising:
a processing system including a processor; and
a memory that stores executable instructions that, when executed by the processing system, facilitate performance of operations, comprising:
responsive to a selection from among a list of members of a social network, facilitating establishing a communication session that includes exchanging communications between a first member device and a second member device, wherein the second member device is indicated in the selection, wherein the first and second member devices are associated via the social network, and wherein the social network comprises a social network application which has selective accessibility for member devices and which is managed by a social network server;
receiving, as a captured speech message, a speech message that is captured by a speech capture element in accordance with a pattern of prior speech messages, wherein the speech capture element is part of the first member device;
transmitting, to the second member device, a message that is representative of the captured speech message; and
updating, according to an accuracy of the captured speech message, a user profile, wherein the accuracy of the captured speech message is in relation to a speech capture time period.

11. The network element of claim 10, wherein the operations further comprise determining, based on prior speech messages that are in accordance with the pattern of prior speech messages, the speech capture time period that is based on an elapsed time between: an initiating of the communication session, and a period after detecting that a user has stopped speaking, wherein the communications are in relation to a media program.

12. The network element of claim 11, wherein the operations further comprise:
presenting, by way of a display which is communicatively coupled to the network element, the list of members.

13. The network element of claim 10, wherein the communication session is initiated responsive to one of: a duration of a selection of a button, wherein the button is on a user interface of the first member device; or a sequence of a selection, and wherein the pattern of prior speech messages is determined by one of the first member device or the processor.

14. The network element of claim 10, wherein the pattern of prior speech messages is derived from user profile data, wherein the user profile data is updated by monitoring speech message patterns.

15. The network element of claim 10, wherein the operations further comprise:
receiving a group of messages that are generated by the second member device; and
presenting, at a display device that is communicatively coupled to the network element, the group of messages.

16. A non-transitory, machine-readable storage medium, comprising executable instructions that, when executed by a processing system including a processor, facilitate performance of operations, comprising:
initiating a communication session responsive to a selection from among a list of members of a social network, wherein the selection includes a member communication device, wherein the social network comprises a social network application which has selective accessibility for member devices and which is managed by a social network server;

activating a speech capture element, wherein the speech capture element is maintained, for a speech capture time period, in an active state;

detecting, at the speech capture element, a speech message;

transmitting, to the member communication device, a message that is representative of the speech message; and appending a user profile, wherein the user profile is appended according to a time that is based on the activation of the speech capture element and that is based on an end of the speech message.

17. The non-transitory, machine-readable storage medium of claim 16, wherein a pattern of prior speech messages is determined by one of: a processor that is coupled to the speech capture element, a media processor communicatively coupled to the member communication device, or a remote server.

18. The non-transitory, machine-readable storage medium of claim 16, wherein a pattern of prior speech messages is derived from user profile data, wherein the user profile data is updated by monitoring speech message patterns.

19. The non-transitory, machine-readable storage medium of claim 16, wherein the operations further comprise: determining, based on prior speech messages that are in accordance with a pattern of prior speech messages, a speech capture time period that is based on a time between: an activation of the initiating the communication session, and a period after detecting that a user has stopped speaking.

20. The non-transitory, machine-readable storage medium of claim 16, wherein the operations further comprise presenting, by way of a display, the list of members.

* * * * *